United States Patent
Zhang et al.

(10) Patent No.: US 11,133,771 B2
(45) Date of Patent: Sep. 28, 2021

(54) INTEGRATED FAULT ISOLATION AND PROGNOSIS SYSTEM FOR ELECTRIC DRIVE SYSTEM

(71) Applicant: GM GLOBAL TECHNOLOGY OPERATIONS LLC, Detroit, MI (US)

(72) Inventors: Jiyu Zhang, Sterling Heights, MI (US); Siddharth Ballal, Fishers, IN (US); Lei Hao, Troy, MI (US); Wesley G. Zanardelli, Rochester, MI (US); Bojian Cao, Troy, MI (US); Mutasim Salman, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/702,877

(22) Filed: Dec. 4, 2019

(65) Prior Publication Data

US 2021/0175835 A1    Jun. 10, 2021

(51) Int. Cl.
*H02P 29/028* (2016.01)
*B60W 10/08* (2006.01)
*H02P 29/024* (2016.01)

(52) U.S. Cl.
CPC .......... *H02P 29/028* (2013.01); *B60W 10/08* (2013.01); *H02P 29/027* (2013.01); *H02P 29/0241* (2016.02)

(58) Field of Classification Search
CPC .. H02P 29/028; H02P 29/027; H02P 29/0241; B60W 10/08
See application file for complete search history.

(56) References Cited

U.S. PATENT DOCUMENTS

| | | | |
|---|---|---|---|
| 7,136,733 | B2 * | 11/2006 | Liu ..................... B62D 5/0487 701/43 |
| 10,026,241 | B1 | 7/2018 | Sankavaram et al. |
| 10,054,030 | B2 | 8/2018 | Duan et al. |
| 10,152,834 | B1 | 12/2018 | Sankavaram et al. |
| 10,161,370 | B2 | 12/2018 | Sarwar et al. |
| 10,167,803 | B2 | 1/2019 | Sarwar et al. |
| 10,273,867 | B2 | 4/2019 | Duan et al. |
| 10,355,634 | B1 | 7/2019 | Zhang et al. |

(Continued)

OTHER PUBLICATIONS

U.S. Appl. No. 15/978,720, filed May 14, 2018, Sarwar et al.
U.S. Appl. No. 15/986,282, filed May 22, 2018, Li et al.

*Primary Examiner* — Rina I Duda
(74) *Attorney, Agent, or Firm* — Harness, Dickey & Pierce, P.L.C.

(57) ABSTRACT

An electric drive system of a vehicle comprises a motor, a position sensor, an inverter, sensors to sense current and voltage supplied to the motor, and a controller to control the motor by controlling the inverter based on data from the position sensor and the sensors and a torque command. The controller estimates a motor torque using a motor model, calculates the motor torque, and generates a first state of health for the electric drive system based on a difference between the estimated and calculated motor torques. The controller generates, in response to the first state of health being less than or equal to a first threshold, a second state of health for at least one of the position sensor, the sensors, and the motor, and determines whether one of the position sensor, the sensors, and the motor is faulty based on the first and second states of health.

20 Claims, 10 Drawing Sheets

(56) References Cited

U.S. PATENT DOCUMENTS

| | | | |
|---|---|---|---|
| 10,408,098 B2 | 9/2019 | Sarwar et al. | |
| 2011/0202211 A1* | 8/2011 | Welchko | B60W 10/08 701/22 |
| 2011/0202226 A1* | 8/2011 | Welchko | B60L 15/20 701/31.4 |
| 2013/0238219 A1* | 9/2013 | Ando | B60K 6/445 701/102 |
| 2015/0175010 A1* | 6/2015 | Tang | H02P 29/032 701/22 |
| 2016/0250928 A1* | 9/2016 | Matsuda | B60L 3/003 701/22 |
| 2019/0040812 A1 | 2/2019 | Sarwar et al. | |
| 2019/0250205 A1 | 8/2019 | Sarwar et al. | |

* cited by examiner

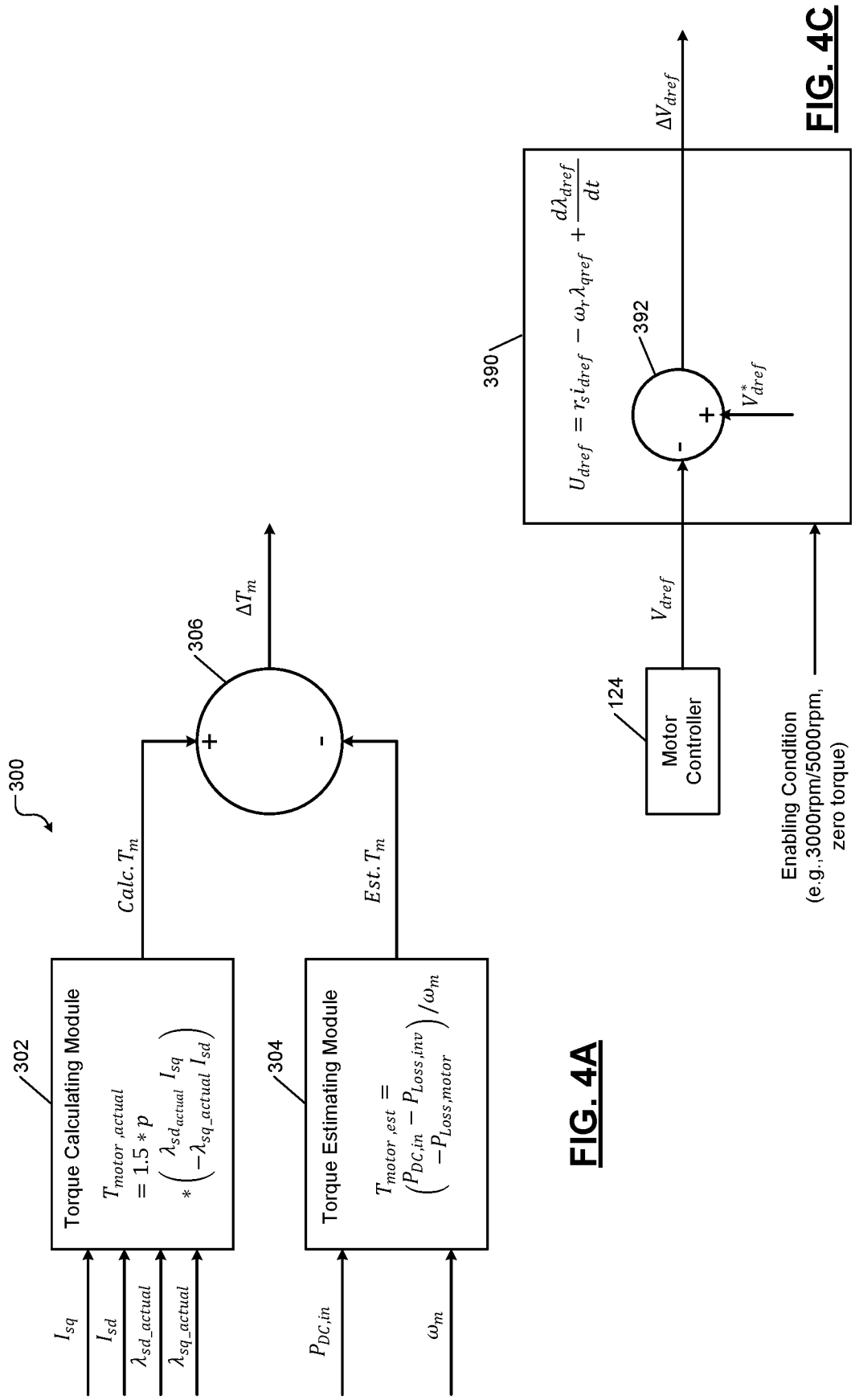

| Health Indicators ╲ Faulty Components | Electric drive performance health indicator | Motor Winding Health indicator | Sensor health indicators | | | |
|---|---|---|---|---|---|---|
| | MTE | MDRVE | MVEab | MVEbc | MVEac | MVEDF |
| Phase A current sensor | X | | X | | X | |
| Phase B current sensor | X | | X | X | | X |
| Phase C current sensor | X | | | X | X | |
| Position sensor | X | | X | X | X | X |
| Electric motor | X | X | | | | |

FIG. 5

INTEGRATED FAULT ISOLATION AND PROGNOSIS SYSTEM FOR ELECTRIC DRIVE SYSTEM

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to electric vehicles and more particularly to an integrated fault isolation and prognosis system for electric drive systems of electric vehicles.

Electric vehicles use an electric drive system. The electric drive system of an electric vehicle (hereinafter the vehicle) comprises an electric motor (hereinafter the motor), an inverter, a resolver, and a motor controller (hereinafter the controller). The inverter inverts DC power from batteries into AC power used to drive the motor. The motor supplies torque to a drivetrain of the vehicle. The resolves senses motor position and provides feedback to the controller. The controller controls the power supplied by the inverter to the motor.

SUMMARY

An electric drive system of a vehicle comprises a motor, a position sensor configured to sense a rotor position of the motor, and an inverter configured to receive DC power and to supply AC power to the motor. The electric drive system further comprises a plurality of sensors configured to sense at least one of current and voltage supplied to the motor by the inverter. The electric drive system further comprises a controller configured to control the motor by controlling the inverter based on data received from the position sensor and the plurality of sensors and based on a torque command. The controller is further configured to estimate a motor torque using a model of the motor. The model estimates the motor torque based on the DC power and motor speed. The controller is further configured to calculate the motor torque based on the sensed current and a magnetic flux of the motor. The controller is further configured to generate a first state of health for the electric drive system based on a difference between the estimated and calculated motor torques. The controller is further configured to generate, in response to the first state of health being less than or equal to a first threshold, a second state of health for at least one of the position sensor, the plurality of sensors, and the motor. The controller is further configured to determine whether one of the position sensor, the plurality of sensors, and the motor is faulty based on a combination of the first state of health and the second state of health.

In another feature, the controller is configured to reduce the torque command in response to determining that one of the position sensor, the plurality of sensors, and the motor is faulty.

In other features, the controller is configured to generate a plurality of health indicators by combining the data from different pairs of the sensors with the rotor position, and to generate the second state of health based on the plurality of health indicators.

In another feature, the controller is configured to determine whether the position sensor is faulty or one of the plurality of sensors is fault based on a combination of the plurality of health indicators.

In other features, the controller is configured to generate a health indicator for the motor by comparing a d-axis reference voltage of the motor at a predetermined operating condition of the motor to a reference voltage calibrated for the predetermined operating condition of the motor, and to generate the second state of health based on the health indicator.

In another feature, the controller is configured to determine whether a motor winding is faulty based on the health indicator.

In another feature, the controller is configured to determine that the electric drive system is operating normally when the first state of health is greater than the first threshold.

In another feature, the controller is configured to generate a first message for scheduling service in response to the second state of health being less than a second threshold.

In another feature, in response to the second state of health being less than a third threshold that is less than the second threshold, the controller is configured to generate a second message indicating a fault and to perform fault mitigation.

In another feature, the controller is configured to mitigate the fault by reducing the torque command.

In still other features, a method for detecting and mitigating faults in an electric drive system of a vehicle comprises sensing, using a position sensor, a rotor position of a motor of the electric drive system of the vehicle. The method further comprises receiving DC power and supplying AC power to the motor using an inverter. The method further comprises sensing, using a plurality of sensors, at least one of current and voltage supplied to the motor by the inverter. The method further comprises controlling the inverter to control the motor based on data received from the position sensor and the plurality of sensors and based on a torque command. The method further comprises estimating a motor torque based on the DC power and motor speed using a model of the motor. The method further comprises calculating the motor torque based on the sensed current and based on a magnetic flux of the motor determined based on the sensed current. The method further comprises generating a first state of health for the electric drive system based on a difference between the estimated and calculated motor torques. The method further comprises generating, in response to the first state of health being less than or equal to a first threshold, a second state of health for at least one of the position sensor, the plurality of sensors, and the motor. The method further comprises determining whether one of the position sensor, the plurality of sensors, and the motor is faulty based on a combination of the first state of health and the second state of health.

In another feature, the method further comprises reducing the torque command in response to determining that one of the position sensor, the plurality of sensors, and the motor is faulty.

In other features, the method further comprises generating a plurality of health indicators by combining the data from different pairs of the sensors with the rotor position, and generating the second state of health based on the plurality of health indicators.

In another feature, the method further comprises determining whether the position sensor is faulty or one of the plurality of sensors is fault based on a combination of the plurality of health indicators.

In other features, the method further comprises generating a health indicator for the motor by comparing a d-axis reference voltage of the motor at a predetermined operating condition of the motor to a reference voltage calibrated for the predetermined operating condition of the motor, and generating the second state of health based on the health indicator.

In another feature, the method further comprises determining whether a motor winding is faulty based on the health indicator.

In another feature, the method further comprises determining that the electric drive system is operating normally when the first state of health is greater than the first threshold.

In another feature, the method further comprises generating a first message for scheduling service in response to the second state of health being less than a second threshold.

In another feature, the method further comprises, in response to the second state of health being less than a third threshold that is less than the second threshold, generating a second message indicating a fault and to perform fault mitigation.

In another feature, the method further comprises mitigating the fault by reducing the torque command.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 4A-4C show calculations of various health indicators of the electric drive system and its various components;

FIG. 5 shows a table of components of the electric drive system and their health indicators used to isolate faulty components;

In the drawings, reference numbers may be reused to identify similar and/or identical elements.

DETAILED DESCRIPTION

The present disclosure provides an integrated fault isolation and prognosis system to detect and isolate electric drive component faults (including motor, inverter and sensors), and to predict electric drive failures, so as to protect drivers from loss of propulsion and walk home situations. The system provides early detection and isolation of electric drive system faults without using additional sensors. The system provides not only predictions of electric drive system failures but also fault mitigation strategies. The system offers drivers peace of mind, ensures reliability and availability of the vehicle, avoids loss of propulsion, and reduces walk home situations.

Figure 1A:
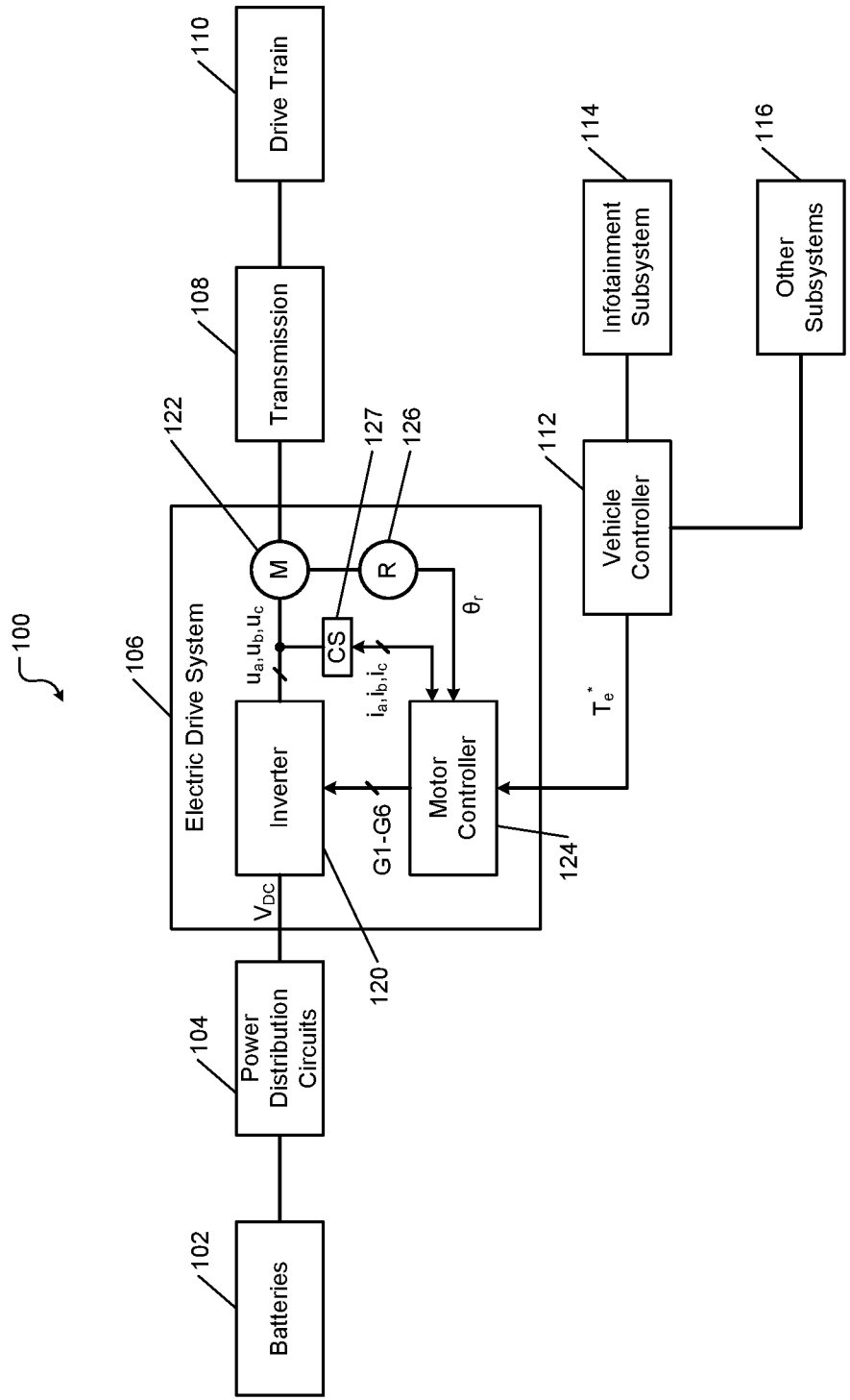
FIG. 1A shows a simplified block diagram of an electric vehicle including an electric drive system.

FIG. 1A shows a simplified block diagram of an electric vehicle 100. The electric vehicle (hereinafter the vehicle) 100 comprises a plurality of batteries 102, power distribution circuits 104, an electric drive system 106, a transmission 108, a drivetrain 110, a vehicle controller 112, an infotainment subsystem 114, and other subsystems 116, which include, for example, a braking subsystem, a navigation subsystem, and so on.

The batteries 102 supply DC power. The power distribution circuits 104 comprise components such as cables, switches, filters, stabilizers, DC-to-DC converters, and so on. The power distribution circuits 104 distribute the DC power to various systems and subsystems of the vehicle 100 such as the electric drive system 106, the vehicle controller 112, and the various subsystems 114, 116.

The electric drive system 106 comprises an inverter 120, a motor 122, a motor controller 124, a resolver 126, and current sensors 127. The inverter 120 converts the DC power into AC power to drive the motor 122. For example, the motor 122 can include a three-phase permanent magnet synchronous motor, although other types of motors such as an induction motor can be used instead.

Figure 1B:
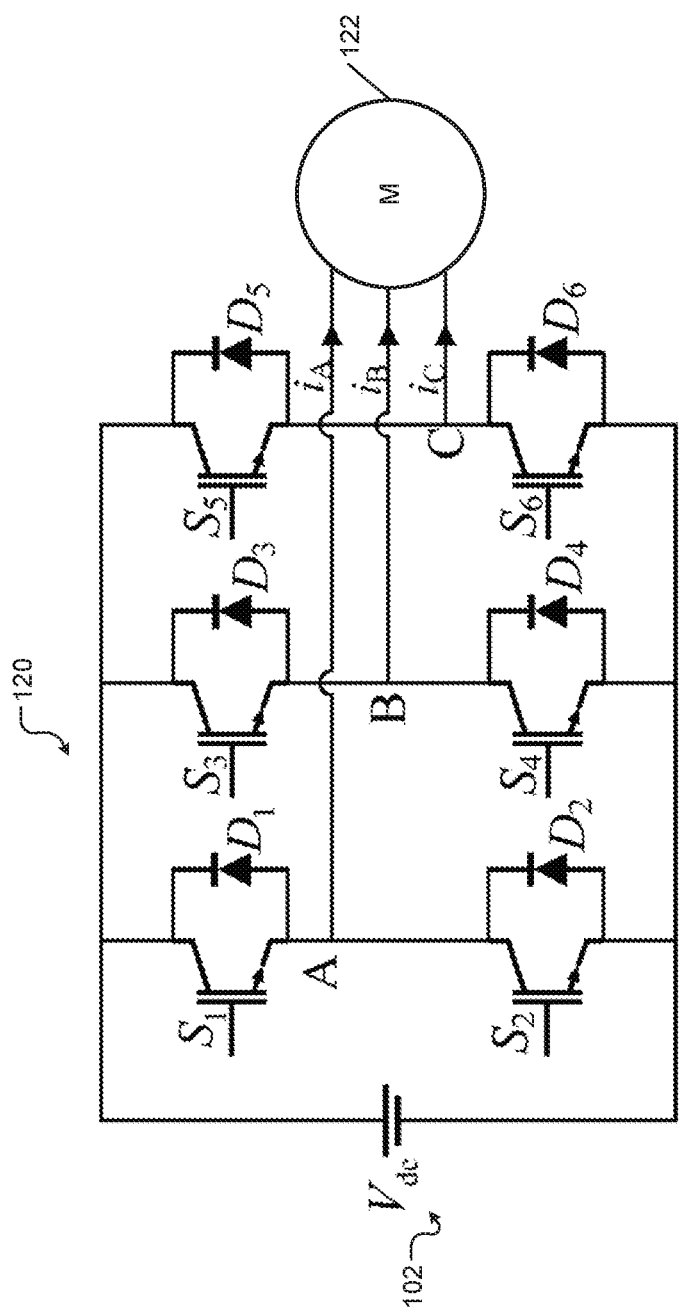
FIG. 1B shows an example of a motor of the electric vehicle driven by an inverter and a battery.

FIG. 1B shows an example of the motor 122 driven by the inverter 120 and the battery 102. The inverter 120 comprises six switches S1-S6 to drive the three phases of the motor 122. The motor controller 124 controls the switches S1-S6 using pulse width modulation (PWM) to control current supplied to the motor 122.

In FIG. 1A, the motor controller 124 controls the inverter 120 and the motor 122 based on the motor position sensed by the resolver 126 and based on phase currents sensed by the current sensors 127. The motor controller 124 ensures that the motor 122 generates the right amount of torque based on a torque command (representing the requested torque) received from the vehicle controller 112.

The transmission 108 (e.g., a single speed gearbox) couples the rotational output of the motor 122 to the drivetrain 110 of the vehicle 100, which in turn rotates the wheels of the vehicle 100. The motor 122 usually does not directly drive the drivetrain 110. The transmission 108 generally comprises a gearbox to reduce motor speed and magnify motor torque transmitted to the drivetrain. The gearbox need not be single speed and can be multi-speed as well.

The motor controller 124 comprises a fault isolation and prognosis system according to the present disclosure. For simplicity, the fault isolation and prognosis system is called the fault detection system throughout the present disclosure. As explained below in detail, the fault detection system implements a hierarchical methodology that detects and isolates early component degradation in the electric drive system 106 as well as predicts electric drive failures.

The fault detection system collects measurements from three-phase current sensors 127, rotor position sensor (e.g., the resolver 126), and reference d axis and q axis voltages in the synchronous reference frame. Before performing fault detection, the fault detection system first detects if there is a sensor/connector or other types of failures based on the available measurements and health indicators. Then the fault detection system detects if there is a degradation in the electric drive system 106 at system level (not component level, which may follow) by comparing an estimated torque with an achieved (i.e., actual or measured) torque. The estimated torque is determined using a model of the electric drive system 106 (described below), and the achieved or actual torque is determined based on the measurements. For example, a mismatch between the two torques may indicate a problem with the motor 122. Then the fault detection system isolates the root cause of degradation at component level, i.e., the fault detection system isolates the faulty component that may be causing the degradation. For example, the faulty component may be the inverter 120 (e.g., due to current sensor faults), the resolver 126, the motor 122, or the motor controller 124.

The fault detection system includes a warning system that informs the driver if there is a component fault that causes the degradation of the drive system performance, and reminds the driver to schedule maintenance for the faulty component. The fault detection system includes a fault mitigation system that limits the d and q current commands of the motor controller 124 to a predetermined or configurable level according to a health state of each component when a component degradation is detected. These and other features of the fault detection system are now described below in detail.

Figure 2A:
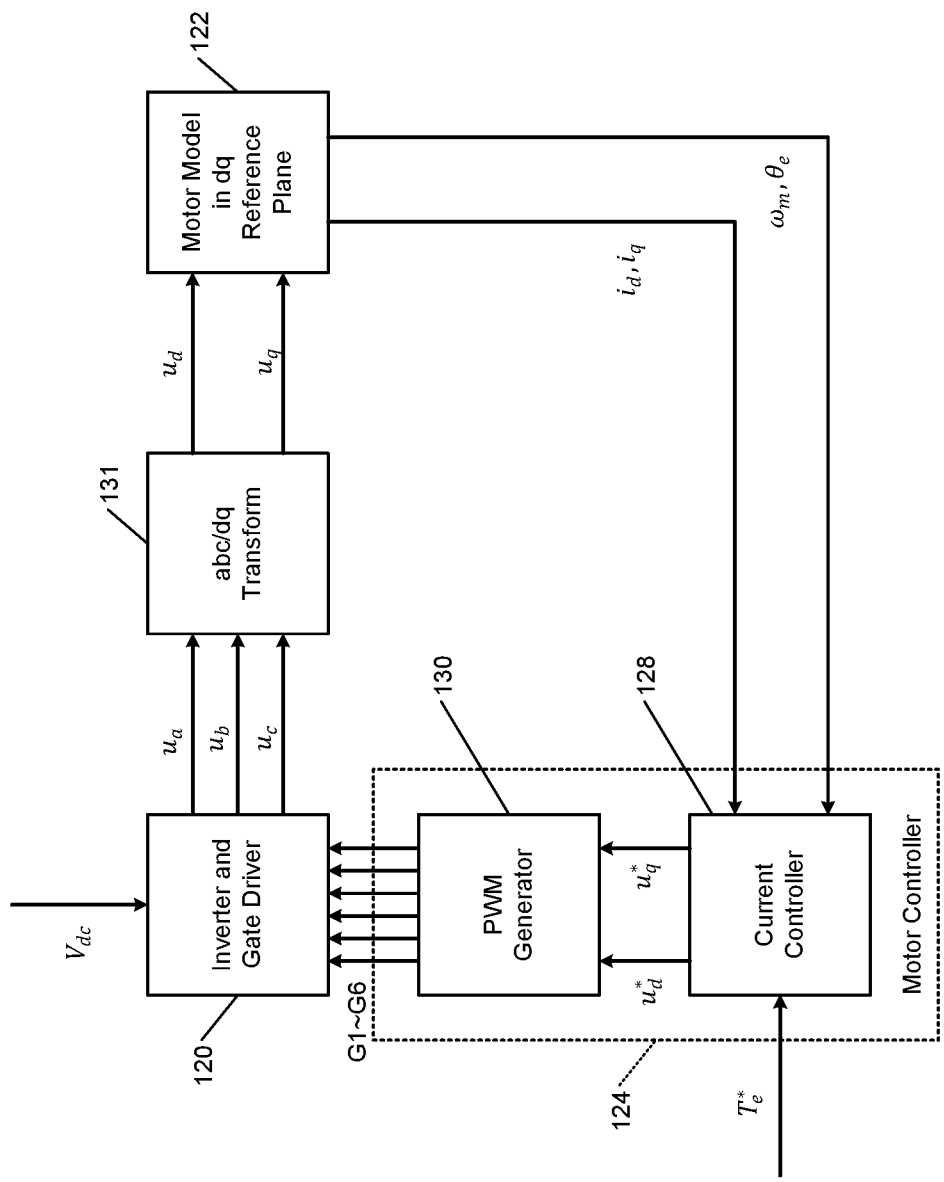
FIGS. 2A and 2B respectively illustrate models of the electric drive system and the motor of the electric vehicle.
Figure 2B:
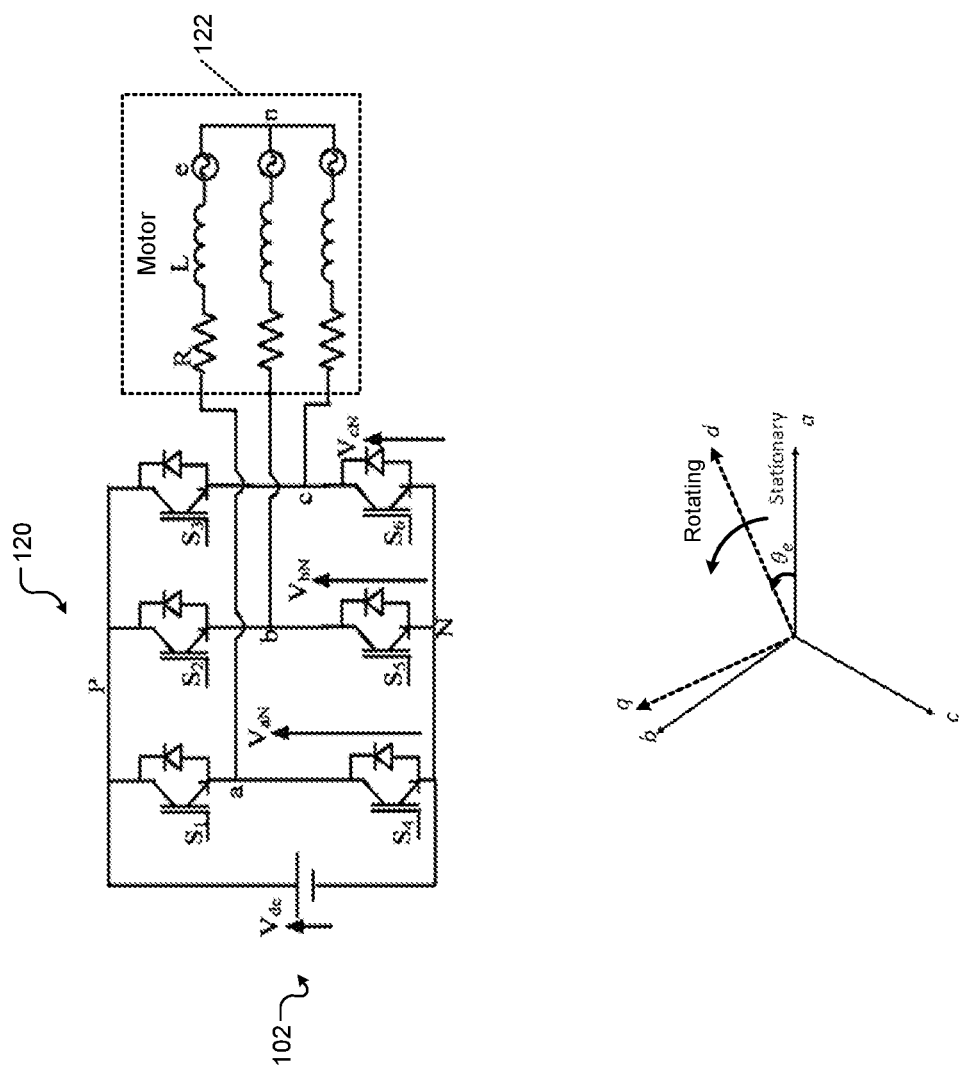

FIGS. 2A and 2B respectively illustrate models of the electric drive system 106 and the motor 122. The model of the electric drive system 106 is used to estimate the torque, which is then used to detect system level faults in the electric drive system 106. In FIG. 2A, the motor controller 124 is shown as comprising a current controller 128 and a pulse width modulation (PWM) generator 130. The inverter 120 is shown as comprising a gate driver (not shown separately) that drives the gates of the switches S1-S6 (see FIG. 2B) under the control of the current controller 130. The current controller 130 receives a torque command from the vehicle controller 112 and also receives feedback from the motor 122 regarding motor current and motor speed. Based on the torque command and the feedback, the current controller 130 controls the current and therefore the torque of the motor 122 by controlling the gate driver in the inverter 120 using PWM generated by the PWM generator 132. An abc/dq transform 131 converts the currents and voltages from the abc reference plane to the dq reference plane.

In FIG. 2B, to simply analysis, a permanent magnet synchronous machine (PMSM) such as the motor 122 is modelled in the rotor reference frame (i.e., the dq reference frame). The transformation between the variables in the stationary three phase variables reference frame ($f_{abc}$) and the variables in the rotor reference frame ($f_{dq}$) is represented as:

$$f_{dq0} = \sqrt{\frac{2}{3}} \begin{bmatrix} \cos\theta_r & \cos\left(\theta_r - \frac{2}{3}\pi\right) & \cos\left(\theta_r + \frac{2}{3}\pi\right) \\ -\sin\theta_r & -\sin\left(\theta_r - \frac{2}{3}\pi\right) & -\sin\left(\theta_r + \frac{2}{3}\pi\right) \\ \frac{1}{2} & \frac{1}{2} & \frac{1}{2} \end{bmatrix}$$

If the motor 122 is healthy/balanced, $f_a+f_b+f_c=0$, where f can be voltage, current or magnetic flux.

In FIG. 2A, the dynamics of the electric drive system 106 in the dq reference frame can be characterized by the following equations:

$$\frac{di_q}{dt} = \frac{1}{L_q}(u_q - R_s i_q - L_d p\omega_m i_d - \lambda_m \omega_r)$$

$$\frac{di_d}{dt} = \frac{1}{L_d}(u_d - R_s i_d + L_q p\omega_m i_q)$$

$$\frac{d\omega_m}{dt} = \frac{1}{J}(T_e - b\omega_m - T_L)$$

where $$\omega_m = \frac{1}{p}\frac{d\theta_e}{dt};$$

and $T_e = 1.5p\lambda_m i_q + (L_d - L_q)i_d i_q$.

The following notations are used in the above equations, which are also called dynamic equations. $u_q$, $u_d$: q and d axis voltages; $i_q$, $i_d$: q and d axis currents; $L_q$, $L_d$: q and d axis inductances; $R_s$: Stator resistance; $\lambda_m$: Magnetic flux developed by rotor magnets; p: Number of pole pairs; $T_e$: Electromagnetic torque; $T_L$: Load torque; $\omega_m$: Motor mechanical speed; and $\theta_e$: Electrical speed of the motor 122.

The equations with derivatives of the q and d axis currents $i_q$ and $i_d$ are called electrical equations, where the motor currents, which are transformed from the three phases a, b, and c into the dq reference frame, are expressed as functions of respective q and d axis voltages $u_q$ and $u_d$, and other electrical parameters or electrical characteristics such as resistance and inductance of the motor 122, as shown in these equations.

The equation with the derivative of the mechanical speed $\omega_m$ is called the mechanical equation, where the mechanical speed $\omega_m$ is expressed as a function of various torque values associated with the motor 122, including $T_e$, which is the actual torque produced by the motor 122; $b\omega_m$, which is the friction torque (also called the friction term $T_{friction}$); and $T_L$, which is the load torque, where the load for the motor 122 includes the drivetrain 110.

From energy perspective, the electric drive system 106 can also be modelled as follows. The following modelling equations are called static equations and are based on the conservation of energy principle, where output power is equal to the input power minus power loss.

$$P_{motor,out} = P_{DC,in} - P_{loss}$$

$$P_{motor,out} = T_m * \omega_m, \quad P_{DC,in} = V_{dc} * I_{dc}$$

$$P_{loss} = P_{Loss,inv} + P_{Loss,motor}$$

The following notations are used in these equations. $P_{motor,out}$: output power from the motor 122, which can be calculated from the torque and speed of the motor 122, which in turn can be respectively calculated from current and position of the motor 122, both of which are measurable; $P_{DC,in}$: input power to the electric drive system 106 from DC bus, which can be calculated from the input voltage and current, both of which are measurable; and $P_{loss}$: losses in the electric drive system 106, which include losses in the inverter 120 and in the motor 122, which are a function of current and can therefore be estimated. The motor controller 124 can perform these calculations.

Further, the following notations are used in FIG. 2A. $u_q^*$, $u_d^*$: reference voltages; $V_{dc}$: DC voltage; $T_e^*$: reference torque from the vehicle controller 112; and G1-G6 are switching commands for the switches S1-S6 of the inverter 120.

The fault detection system of the present disclosure generates the model of the electric drive system 106 using the combination of all of the above equations (i.e., using the dynamic and static equations). The fault detection system uses the model to estimate the torque, which is then compared to the actual torque for detecting system level degradation as follows.

Figure 3:
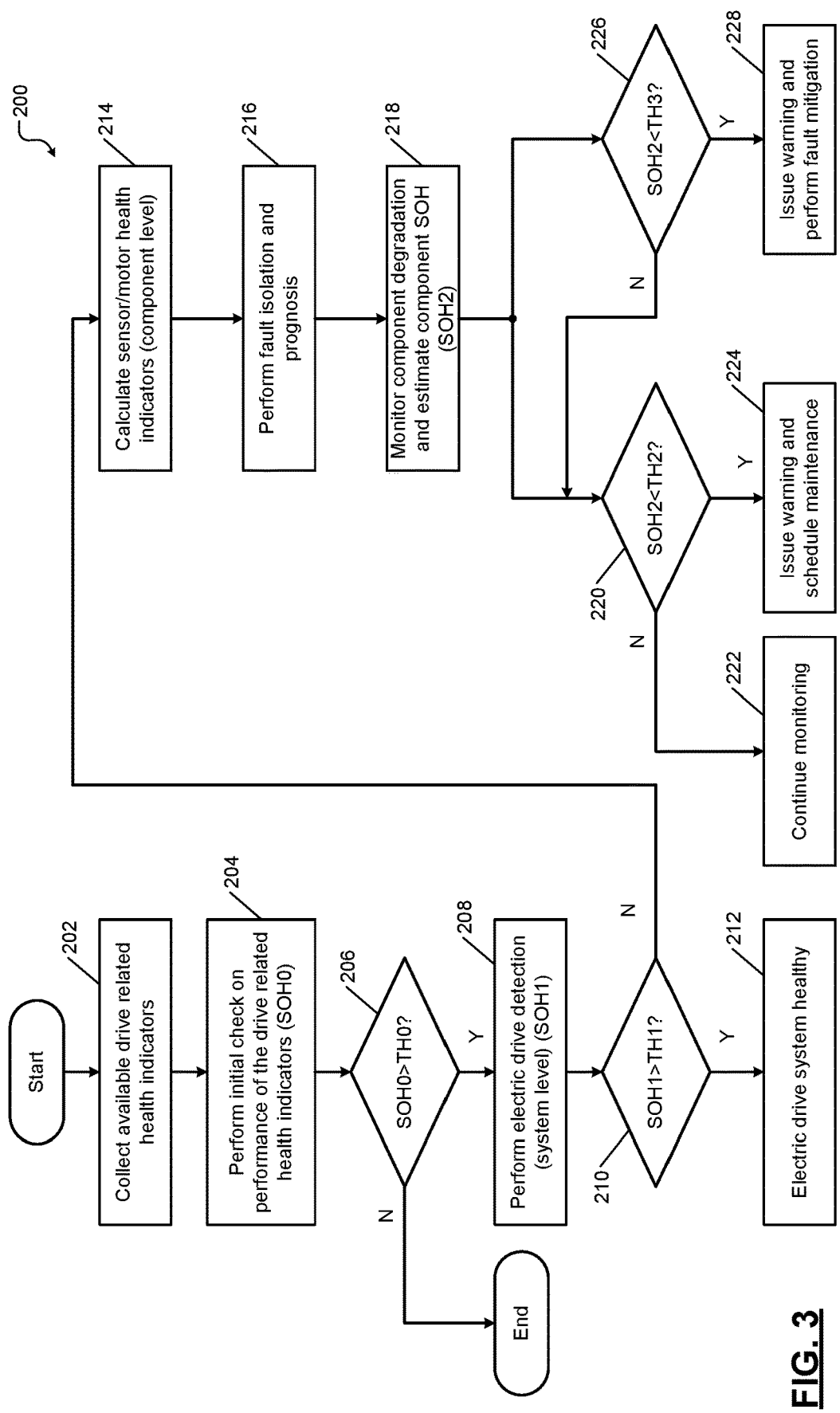
FIG. 3 shows a flowchart of a method for detecting and isolating faults in the electric drive system and for providing warnings and fault mitigation.

FIG. 3 shows a method 200 for detecting and isolating faults in the electric drive system 106 and for providing warnings and fault mitigation according to the present disclosure. For example, the method 200 is performed by the fault detection system implemented in the motor controller 124.

At 202, the method 200 collects available health indicators for sensors (e.g., 126, 127), connectors, etc. of the electric drive system 106. For example, these can include measurements such as currents, voltages, and position of the motor 122 provided by respective sensors. At 204, the method 200 performs an initial check on the performance of these health indicators to determine a state of health of the sensors and connectors (e.g., called SOH0).

At 206, the method 200 determines whether the state of health of the sensors and connectors (SOH0) is greater than or equal to a first threshold TH0 (i.e., whether the sensors and connectors are operating normally). The method 200 ends if the state of health of the sensors and connectors (SOH0) is not greater than or equal to the first threshold TH0 (i.e., if the sensors and connectors are not operating normally). The method 200 proceeds to 208 if the state of health of the sensors and connectors (SOH0) is greater than or equal to a first threshold TH0 (i.e., if the sensors and connectors are operating normally).

At 208, the method 200 performs fault detection at system level using the model of the electric drive system 106 described above with reference to FIGS. 2A and 2B and using the health indicators described below with reference to FIG. 4A. At 210, the method 200 determines whether a system level state of health of the electric drive system 106 (called SOH1), which is determined using the model and the health indicators, is greater than or equal to a second threshold TH1 (i.e., whether the electric drive system 106 is operating normally at the system level).

At 212, the method 200 determines that the electric drive system 106 is healthy (i.e., operating normally) if the system level state of health of the electric drive system 106 (SOH1) is greater than or equal to a second threshold TH1. The method 200 proceeds to 214 if the system level state of health of the electric drive system 106 (SOH1) is not greater than or equal to a second threshold TH1 (i.e., if SOH1<TH1), that is, if the electric drive system 106 is not operating normally at the system level.

At 214, the method 200 performs a component level diagnostics of the electric drive system 106 by calculating health indicators of the sensors and the motor 122 as described below with reference to FIGS. 4B and 4C. At 216, the method 200 compares a set of the health indicators in parallel (i.e., multiple health indicators are combined and compared) to isolate fault down to component level. An example of the comparisons and fault isolation is shown in FIG. 5, which is described below. At 218, the method 200 monitors the isolated component (which is only suspected as failing at this point) for degradation and estimates a state of health for the component (called SOH2).

At 220, the method 200 determines whether the state of health for the component (SOH2) is less than or equal to a third threshold TH2. If the state of health for the component (SOH2) is not less than or equal to the third threshold TH2, the method 200 concludes that the component has degraded only marginally but not significantly to justify issuing a warning and scheduling maintenance. Accordingly, at 222, the method 200 continues to monitor the component if the state of health for the component (SOH2) is not less than or equal to the third threshold TH2. However, if the state of health for the component (SOH2) is less than or equal to the third threshold TH2, the method 200 issues a warning and schedules maintenance at 224.

Additionally, after 218, the method 200 also proceeds to 226, where the method 200 determines whether the state of health for the component (SOH2) is less than or equal to a fourth threshold TH3, where TH2>TH3. The method 200 proceeds to 220 if SOH2 is not less than or equal to TH3. However, if SOH2 is less than or equal to TH3, the method 200 issues a warning to the driver (indicating a fault due to the failure of the component) and performs fault mitigation at 228. For example, the method 200 issues the warning using an audio or visual indication on the infotainment subsystem 114, and the method 200 performs fault mitigation procedure using a fault mitigation system shown and described with reference to FIG. 7 below.

At 216, if more than one component is suspected as failing, steps 218 through 228 are performed for every suspected component. For each component, the thresholds TH2 and TH3 may be calibrated differently (i.e., TH2 and TH3 for Component1 may be different than TH2 and TH3 for Component2) although for each component, TH2 is greater than TH3.

Figure 4B:
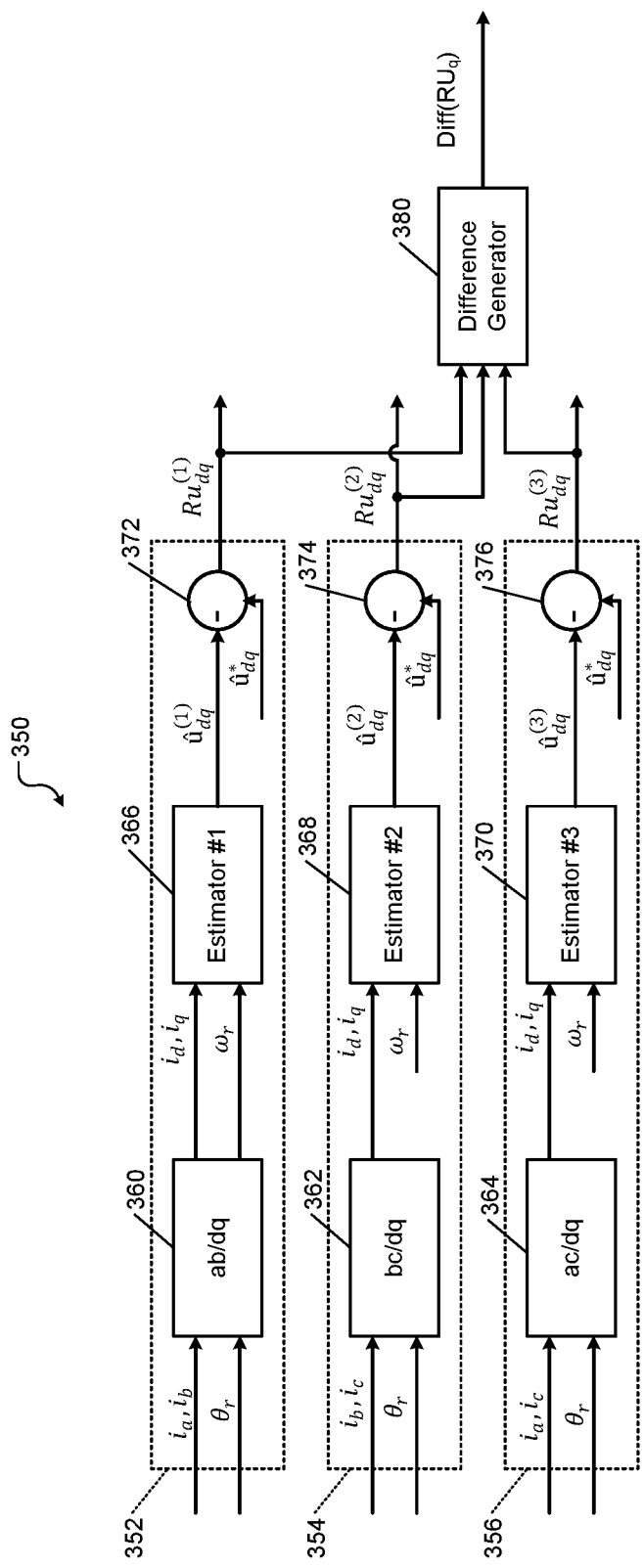

FIGS. 4A-4C show calculations of various health indicators of the electric drive system 106 and its various components. FIG. 4A shows the calculation of a health indicator for indicating performance of the electric drive system 106 at system level. The health indicator is called motor torque error (MTE) and is denoted by $\Delta T_m$ in FIG. 4A. The MTE is a difference between an actual or calculated torque and an estimated torque. The actual torque is denoted by Calc. $T_m$ and is calculated based on $I_{sq}$, $I_{sd}$, $\lambda_{sd\text{-}actual}$, and $\lambda_{sq\text{-}actual}$ using the equation $T_{motor,actual}=1.5*p(\lambda_{sd\text{-}actual}*I_{sq}-\lambda_{sq\text{-}actual}*I_{sd})$. The estimated toque is denoted by Est. $T_m$ and is estimated based on $P_{DC,in}$ and $\omega_m$ using the equation $T_{motor,est}=(P_{DC,in}-P_{loss,inv}-P_{loss,motor})/\omega_m$. The input power $P_{DC,in}$ and the power losses are calculated based on current and voltages sensed from the motor 122.

In FIG. 4A, the health indicator MTE is calculated by a first health indicator calculating module 300, which is part of the fault detection system implemented in the motor controller 124. The first health indicator calculating module 300 comprises a torque calculating module 302 and a torque estimating module 304. The torque calculating module 302 calculates the actual torque Calc. $T_m$ and based on $I_{sq}$, $I_{sd}$, $\lambda_{sd\text{-}actual}$, and $\lambda_{sq\text{-}actual}$ using the equation $T_{motor,actual}=1.5*p(\lambda_{sd\text{-}actual}*I_{sq}-\lambda_{sq\text{-}actual}*I_{sd})$. The torque estimating module 304 generates the estimated toque Est. $T_m$ based on $P_{DC,in}$ and $\omega_m$ using the equation $T_{motor,est}=(P_{DC,in}-P_{loss,inv}-P_{loss,motor})/\omega_m$. A first difference determining module 306 determines MTE $\Delta T_m$ by determining the difference between the actual torque Calc. $T_m$ and the estimated toque Est. $T_m$.

The system level state of health SOH1 of the electric drive system 106 shown in FIG. 3 is defined based on the MTE. The larger the MTE, the greater the degradation, which means the SOH1 is worse. Accordingly, SOH1 may be defined based on the range of the MTE. For example, various levels of SOH1 (e.g., good/normal/bad, very-good/good/normal/bad/very-bad, and so on) can be defined depending on the range in which the MTE lies.

If the state of health SOH1 of the electric drive system 106 at system level indicates degradation of the electric drive system 106, the fault detection system then determines which component of the electric drive system 106 is degrading or is faulty. The fault detection system isolates which of the three current sensors 127 (one current sensor is used per phase of the motor 122) or the resolver 126 if faulty. For example, the fault isolation system can detect sensor offset, drifting, gain errors, and unknown failure modes. The fault detection system isolates the faulty component using the following health indicators for the current sensors 127 and the resolver 126.

FIG. 4B shows the health indicators for the current sensors 127 and the resolver 126, which are the component level health indicators for the electric drive system 106. These are shown as SOH2 in FIG. 3. Using the static and dynamic modelling equations described above, the fault detection system combines two different currents of the three currents at a time with the motor position and estimates three different voltage errors.

Specifically, in a first combination, currents $i_a$ and $i_b$ of phases a and b are combined with the rotor position $\theta_r$; in a second combination, currents $i_b$ and $i_c$ of phases b and c are combined with the rotor position $\theta_r$; and in a third combination, currents $i_a$ and $i_c$ of phases a and c are combined with the rotor position $\theta_r$. Note that the rotor position is used as a common input for all three combinations.

For each combination, the respective currents are transformed into the currents $i_d$ and $i_q$, and the motor speed $\omega_r$ is calculated from the rotor position $\theta_r$. For each combination, an estimator (e.g., a sliding mode observer) is used to estimate a respective input voltage.

For example, for the first combination, a first estimator estimates a first value of the input voltage $u_{dq}$ based on the currents $i_d$ and $i_q$, which are derived from the currents $i_a$ and $i_b$ of phases a and b, and the motor speed $\omega_r$; for the second combination, a second estimator estimates a second value of the input voltage $u_{dq}$ based on the currents $i_d$ and $i_q$, which are derived from the currents $i_b$ and $i_c$ of phases b and c, and the motor speed $\omega_r$; and for the third combination, a third estimator estimates a third value of the input voltage $u_{dq}$ based on the currents $i_d$ and $i_q$, which are derived from the currents $i_a$ and $i_c$ of phases a and c, and the motor speed $\omega_r$. The estimators for each combination are identical.

For each combination, a comparator compares the estimated input voltage $u_{dq}\wedge$ to a reference voltage $u_{dq}*$, which is the same for each combination, and generates a difference between the estimated voltage and the reference voltage. Thus, for the three combinations, three comparators generate three differences between the respective estimated voltages and the reference voltage.

For example, a first difference, called a first motor voltage error, is based on currents of phases a and b and is denoted by $MVE_{ab}$ or $Ru_{dq}^1$. A second difference, called a second motor voltage error, is based on currents of phases b and c and is denoted by $MVE_{bc}$ or $Ru_{dq}^2$. A third difference, called a third motor voltage error, is based on currents of phases a and c and is denoted by $MVE_{ac}$ or $Ru_{dq}^3$. Based on these three differences, the fault detection system can isolate which of the three current sensors 127 is faulty since a combination of two different currents from two different current sensors 127 is used. Further, the fault detection system can isolate whether the resolver 126 is faulty instead of the current sensors 127 (if all the three current sensors 127 are operating normally) since the output of the resolver 126 is common to each of the three combinations.

A fourth comparator compares the three differences to further isolate the degrading or faulty component. The fourth comparator generates a motor voltage error difference function denote by $MVE_{DF}$ or $Diff(RU_q)$. This voltage error difference represents the difference across all the three differences (also called residuals $Ru_{dq}^1$, $Ru_{dq}^2$ and $RU_{dq}^3$). If one of the three phase current sensors 127 is faulty, the voltage error difference $Diff(RU_q)$ would be nonzero, since only two of the three residuals are non-zero. While for the resolver fault, the voltage error difference will stay zero, since all the three differences are nonzero but the effect of a resolver fault on all the three residuals is similar. On the other hand, if the motor winding is faulty, the motor model used does not fit the actual motor performance; thus all the three residuals are non-zero; and regardless of which of the three phase winding is faulty, the voltage error difference would be non-zero, since the effect of a motor fault would be different on the three residuals. Therefore, based on the performance of the three differences (i.e., the three residuals) and the motor voltage error difference function $MVE_{DF}$ or $Diff(RU_q)$, the fault detection system can isolate whether the current sensors 127, the resolver 126, or the motor 122 is faulty.

In FIG. 4B, the health indicator $MVE_{DF}$ or $Diff(RU_q)$ is calculated by a second health indicator calculating module 350, which is part of the fault detection system implemented in the motor controller 124. The second health indicator calculating module 350 comprises three combining modules: a first combining module 352, a second combining module 354, and a third combining module 356. The first combining module 352 receives the currents $i_a$ and $i_b$ of phases a and b. The second combining module 354 receives the currents $i_b$ and $i_c$ of phases b and c. The third combining module 356 receives the currents $i_a$ and $i_c$ of phases a and c. Each of the three combining modules 352, 354, and 356 receives the rotor position $\theta_r$.

The three combining modules 352, 354, and 356 respectively include transform functions ab/dq 360, bc/dq 362 and ac/dq 364 to transform the respective currently into the currents $i_d$ and $i_q$. The three combining modules 352, 354, and 356 respectively include estimators 366, 368, and 370 that estimate the voltages $u_{dq}^{\wedge 1}$, $u_{dq}^{\wedge 2}$, and $u_{dq}^{\wedge 3}$ based on the respective currents $i_d$ and $i_q$ and the motor speed $\omega_r$ derived from the rotor position $\theta_r$. The three combining modules 352, 354, and 356 respectively include comparators 372, 374, and 376 that compare the respective estimated voltages $u_{dq}^{\wedge 1}$, $u_{dq}^{\wedge 2}$, and $u_{dq}^{\wedge 3}$ to the reference voltage $u_{dq}*$ to generate the three differences $Ru_{dq}^1$, $Ru_{dq}^2$, and $Ru_{dq}^3$. A fourth comparator 380 generates the health indicator $MVE_{DF}$ or $Diff(RU_q)$ based on a comparison of the three differences $Ru_{dq}^1$, $Ru_{dq}^2$, and $Ru_{dq}^3$. The equation used by the fourth comparator 380 is:

$$Diff(RU_q) = \sqrt{(Ru_q^{(1)} - Ru_q^{(2)})^2 + (Ru_q^{(2)} - Ru_q^{(3)})^2 + (Ru_q^{(1)} - Ru_q^{(3)})^2}$$

If all of the three differences $Ru_{dq}^1$, $Ru_{dq}^2$, and $Ru_{dq}^3$ are nonzero, then the resolver 126 is faulty. If only two of the three differences $Ru_{dq}^1$, $Ru_{dq}^2$, and $Ru_{dq}^3$ are nonzero, then the resolver 126 is not faulty, but one of the three current sensors 127 is faulty. The faulty current sensor can be further isolated by determining which two of the three differences $Ru_{dq}^1$, $Ru_{dq}^2$, and $Ru_{dq}^3$ are nonzero. The fourth comparator 380 performs further fault isolations (i.e., determining whether the resolver 126 or the current sensors 127 or the motor 122 is faulty). FIG. 5 shows this fault isolation in further detail.

FIG. 4C shows another health indicator that indicates a state of health of the motor winding, which is a component level health indicator for the electric drive system 106, and which is shown as SOH2 in FIG. 3. Stator windings of the motor 122 can deteriorate over time. For example, the insulation on the stator windings can deteriorate, which can develop a short circuit in the stator windings, which in turn can adversely affect motor currents.

The health of the stator windings can be determined by comparing the d axis reference voltage with a nominal d axis reference voltage at specific motor operating speed and torque condition. For example, the d axis reference voltage is given by the equation:

$$u_d = R_s i_d - L_q p \omega_m i_q + L_d \frac{di_d}{dt}$$

For high speed and near zero torque condition, the above equation yields:

$$u_d \approx R_s i_d + L_d \frac{di_d}{dt}$$

Thus, a fault in the stator winding, usually in the form of a change in the stator resistance, is reflected in the d axis voltage.

The motor controller 124 supplies a voltage $V_{dref}$ to the motor 122. This voltage available from the motor controller 124 can be compared with a reference voltage $V_{dref}^*$, which is a nominal reference voltage calibrated using a known healthy motor similar to the motor 122 running at medium to high speed and near zero torque condition. For example, the speed can be greater than a threshold (e.g., 3000 rpm). A difference $\Delta V_{dref}$ between the reference voltage $V_{dref}^*$ and the voltage $V_{dref}$ supplied to the motor 122 by the motor controller 124 at the high speed and near zero torque is determined. The difference $\Delta V_{dref}$ is the health indicator for the motor winding and is called the d axis reference voltage error of the motor 122, which is denoted by MDRVE or $\Delta U_{dref}$, where $U_{dref}$ is given by the following equation:

$$U_{dref} = r_s i_{dref} - \omega_r \lambda_{qref} + \frac{d\lambda_{dref}}{dt}$$

In FIG. 4C, the health indicator MDRVE is calculated by a third health indicator calculating module 390, which is part of the fault detection system implemented in the motor controller 124. The third health indicator calculating module 390 comprises a comparator 392 that compares the reference voltage $V_{dref}^*$ to the voltage $V_{dref}$ supplied to the motor 122 by the motor controller 124 when the motor speed is medium to high (above a threshold) and the motor torque is near zero. As mentioned above, the reference voltage $V_{dref}^*$ is the voltage measured when the motor 122 is healthy (i.e., fault free or operating normally). The voltage $V_{dref}$ is the current voltage reference read from the motor controller 124 during actual use. Based on the comparison, the comparator 392 generates the difference $\Delta V_{dref}$, which is also called MDRVE or $\Delta U_{dref}$.

FIG. 5 shows a table of components of the electric drive system 106 and their health indicators, which is used by the fault detection system to isolate the faulty components. The table is populated and stored in the motor controller 124. In the table, an "X" mark indicates that the component in the corresponding row, when faulty, affects the health indicator in the corresponding column. In the table, the current sensors are elements 127, the position sensor is element 126, and the motors is element 122 shown in FIG. 1A.

As shown, a fault in phase A current sensor is reflected in the health indicators MTE, MVEab, MVEac, and MVDEF. Stated differently, the health indicators MTE, MVEab, MVEac, and MVDEF (marked "X" in the table) can help isolate a faulty phase A current sensor. A fault in phase B current sensor is reflected in the health indicators MTE, MVEab, MVEbc, and MVDEF. Stated differently, the health indicators MTE, MVEab, MVEbc, and MVDEF (marked "X" in the table) can help isolate a faulty phase B current sensor. A fault in phase C current sensor is reflected in the health indicators MTE, MVEbc, MVEac, and MVDEF. Stated differently, the health indicators MTE, MVEbc, MVEac, and MVDEF (marked "X" in the table) can help isolate a faulty phase C current sensor.

Further, as shown, a fault in position sensor (e.g., the resolver 126) is reflected in the health indicators MTE, MVEab, MVEbc, and MVEac. Stated differently, the health indicators MTE, MVEab, MVEbc, and MVEac (marked "X" in the table) can help isolate a faulty position sensor (e.g., the resolver 126). A fault in the motor 122 is reflected in the health indicators MTE and MDRVE. Stated differently, the health indicators MTE and MDRVE (marked "X" in the table) can help isolate a faulty motor 122.

Figure 6:
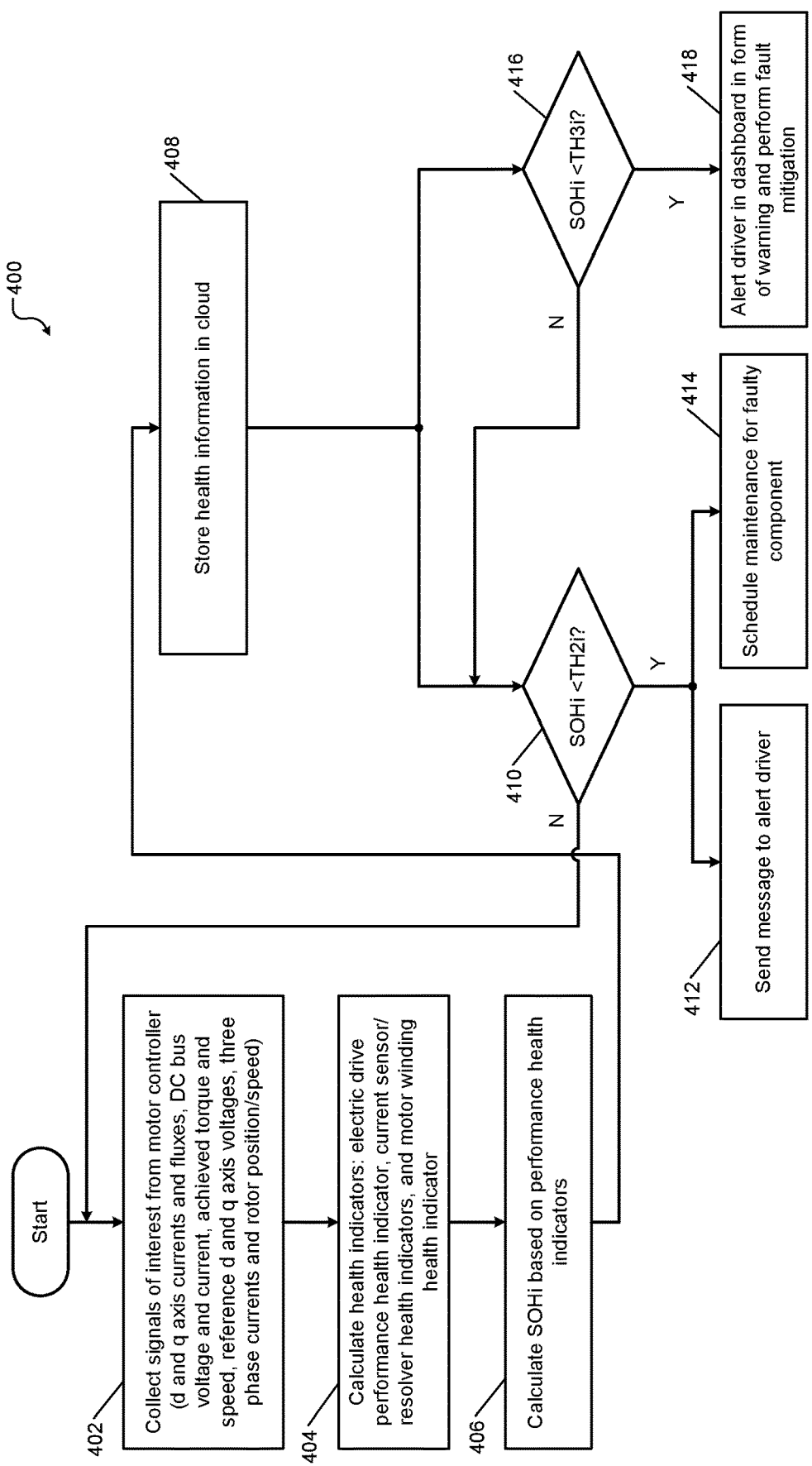
FIG. 6 shows a flowchart of a method for warning drivers based on the state of health of the electric drive system, scheduling maintenance for faulty components, and performing fault mitigation.

FIG. 6 shows a method 400 for warning drivers based on the state of health of the electric drive system 106, scheduling maintenance for faulty components, and performing fault mitigation. For example, the method 400 is performed by the fault detection system implemented in the motor controller 124.

At 402, the method 400 collects signals of interest from the motor controller 124. For example, the signals of interest include d and q axis currents and fluxes of the motor 122, DC bus voltage and current received by the electric drive system 106 from the batteries 102 via the power distribution circuits 104, achieved or actual torque and speed of the motor 122, reference d and q axis voltages of the motor 122, and three phase currents and rotor position and speed of the motor 122.

At 404, the method 400 calculates the various health indicators. For example, the health indicators include the system level health indicator MTE indicating the performance of the electric drive system 106; the component level health indicators MVEab, MVEbc, MVEac, and MVEDF indicating the performance of the current sensors 127 and the resolver 126; and the health indicator MDRVE indicating the health of the motor windings. At 406, the method 400 calculates the various state of health indicators SOHi based on the performance health indicators, where SOHi represents the state of health of an $i^{th}$ component.

At 408, the method 400 sends and stores the above health information in cloud. For example, a communication subsystem of the vehicle 100 (e.g., one of the other subsystems 116 in FIG. 1) may send the health information from the vehicle 100 to the cloud via a suitable network (e.g., cellular network, the Internet, and so on). Historical health information from vehicles can be used to indicate trends in component performance, to predict failures and schedule service, and to recommend design changes for the components using machine learning techniques.

At 410, the method 400 determines if an SOHi is less than or equal to a threshold TH2,i (where the threshold TH2,i is similar to the threshold TH2 described above with reference the method 200 shown in FIG. 3). The method 400 returns to 402 is the SOHi is not less than or equal to a threshold TH2,i (which indicates that the component i is healthy). The method 400 proceeds to 412 or 414 if the SOHi is less than or equal to a threshold TH2,i (which indicates that the component i is not healthy).

At 412, the method 400 sends an email or a text message to alert the driver if the SOHi indicates that the component i is degrading but the degradation is not sever enough to warrant scheduling service. At 414, the method 400 schedules maintenance for the component i if the SOHi indicates that the component i has degraded sufficiently to justify service.

At 416, the method 400 determines if an SOHi is less than or equal to a threshold TH3,i (where the threshold TH3,i is similar to the threshold TH3 described above with reference the method 200 shown in FIG. 3). The method 400 returns to 410 is the SOHi is not less than or equal to a threshold TH3,i. The method 400 proceeds to 418 if the SOHi is less than or equal to a threshold TH3,i (which indicates that the component i is faulty). At 418, the method informs the driver of the fault (e.g., using an audio or visual indication on the infotainment subsystem 114) and performs fault mitigation procedure (e.g., fault mitigation shown and described with reference to FIG. 7 below).

Figure 7:
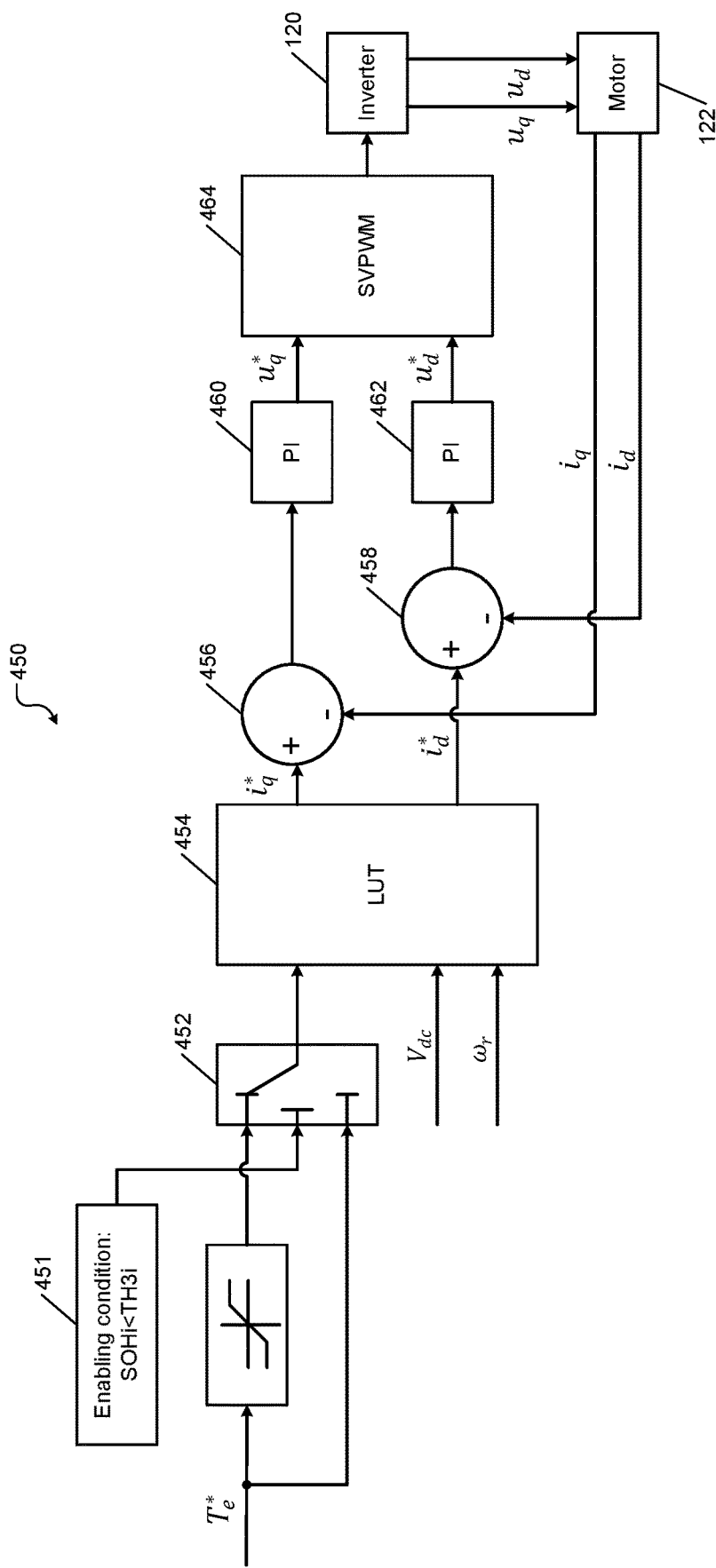
FIG. 7 shows a system for performing fault mitigation when a fault occurs in the electric drive system.

FIG. 7 shows a system 450 for fault mitigation. The system 450 is part of the fault detection system implemented in the motor controller 124. The system 450 comprises a switch 452 that switches the operation of the system between normal operation and fault mitigation based on whether an enabling condition (e.g., SOHi<TH3,i) 451 has occurred. The switch 452 receives a torque command $T_e^*$ from the vehicle controller 112. The torque command $T_e^*$ is scaled down when a fault occurs, which in turn reduces the performance of the motor 122 when a fault occurs.

The system 450 comprises a lookup table 454 that receives the torque command $T_e^*$ from the switch 452 and receives $V_{dc}$ and $\omega_r$. The lookup table 454 outputs reference currents $i_d^*$ and $i_q^*$ in the dq reference frame based on the torque command $T_e^*$, $V_{dc}$, and $\omega_r$. The system 450 comprises combiners 456 and 458 that respectively combine the reference currents $i_d^*$ and $i_q^*$ and actual measured currents $i_d$ and $i_q$ received as feedback from the motor 122. Outputs of the combiners 456, 458 are respectively fed to PI controllers 460 and 462 that generate reference voltages $u_d^*$ and $u_q^*$ in the dq reference frame. The reference voltages $u_d^*$ and $u_q^*$ are input to a space vector PWM (SVPWM) generator 464. The SVPWM generator 464 drives the inverter 120 based on the reference voltages $u_d^*$ and $u_q^*$. The inverter 120 drives the motor 122.

The foregoing description is merely illustrative in nature and is not intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. An electric drive system of a vehicle comprising:
   a motor;
   a position sensor configured to sense a rotor position of the motor;
   an inverter configured to receive DC power and to supply AC power to the motor;
   a plurality of sensors configured to sense at least one of current and voltage supplied to the motor by the inverter; and
   a controller configured to control the motor by controlling the inverter based on data received from the position sensor and the plurality of sensors and based on a torque command,
   wherein the controller is further configured to:
      estimate a motor torque using a model of the motor, wherein the model estimates the motor torque based on the DC power and motor speed;
      calculate the motor torque based on the sensed current and a magnetic flux of the motor;
      generate a first state of health for the electric drive system based on a difference between the estimated and calculated motor torques;
      generate, in response to the first state of health being less than or equal to a first threshold, a second state of health for at least one of the position sensor, the plurality of sensors, and the motor; and
      determine whether one of the position sensor, the plurality of sensors, and the motor is faulty based on a combination of the first state of health and the second state of health.

2. The electric drive system of claim 1 wherein the controller is configured to reduce the torque command in response to determining that one of the position sensor, the plurality of sensors, and the motor is faulty.

3. The electric drive system of claim 1 wherein the controller is configured to:
   generate a plurality of health indicators by combining the data from different pairs of the sensors with the rotor position; and
   generate the second state of health based on the plurality of health indicators.

4. The electric drive system of claim 3 wherein the controller is configured to determine whether the position sensor is faulty or one of the plurality of sensors is faulty based on a combination of the plurality of health indicators.

5. The electric drive system of claim 1 wherein the controller is configured to:
   generate a health indicator for the motor by comparing a d-axis reference voltage of the motor at a predetermined operating condition of the motor to a reference voltage calibrated for the predetermined operating condition of the motor; and
   generate the second state of health based on the health indicator.

6. The electric drive system of claim 5 wherein the controller is configured to determine whether the motor winding is faulty based on the health indicator.

7. The electric drive system of claim 1 wherein the controller is configured to determine that the electric drive system is operating normally when the first state of health is greater than the first threshold.

8. The electric drive system of claim 1 wherein the controller is configured to generate a first message for scheduling service in response to the second state of health being less than a second threshold.

9. The electric drive system of claim 8 wherein, in response to the second state of health being less than a third threshold that is less than the second threshold, the controller is configured to generate a second message indicating a fault and to perform fault mitigation.

10. The electric drive system of claim 9 wherein the controller is configured to mitigate the fault by reducing the torque command.

11. A method for detecting and mitigating faults in an electric drive system of a vehicle, the method comprising:
sensing, using a position sensor, a rotor position of a motor of the electric drive system of the vehicle;
receiving DC power and supplying AC power to the motor using an inverter;
sensing, using a plurality of sensors, at least one of current and voltage supplied to the motor by the inverter;
controlling the inverter to control the motor based on data received from the position sensor and the plurality of sensors and based on a torque command;
estimating a motor torque based on the DC power and motor speed using a model of the motor;
calculating the motor torque based on the sensed current and based on a magnetic flux of the motor determined based on the sensed current;
generating a first state of health for the electric drive system based on a difference between the estimated and calculated motor torques;
generating, in response to the first state of health being less than or equal to a first threshold, a second state of health for at least one of the position sensor, the plurality of sensors, and the motor; and
determining whether one of the position sensor, the plurality of sensors, and the motor is faulty based on a combination of the first state of health and the second state of health.

12. The method of claim 11 further comprising reducing the torque command in response to determining that one of the position sensor, the plurality of sensors, and the motor is faulty.

13. The method of claim 11 further comprising:
generating a plurality of health indicators by combining the data from different pairs of the sensors with the rotor position; and
generating the second state of health based on the plurality of health indicators.

14. The method of claim 13 further comprising determining whether the position sensor is faulty or one of the plurality of sensors is faulty based on a combination of the plurality of health indicators.

15. The method of claim 11 further comprising:
generating a health indicator for the motor by comparing a d-axis reference voltage of the motor at a predetermined operating condition of the motor to a reference voltage calibrated for the predetermined operating condition of the motor; and
generating the second state of health based on the health indicator.

16. The method of claim 15 further comprising determining whether the motor winding is faulty based on the health indicator.

17. The method of claim 11 further comprising determining that the electric drive system is operating normally when the first state of health is greater than the first threshold.

18. The method of claim 11 further comprising generating a first message for scheduling service in response to the second state of health being less than a second threshold.

19. The method of claim 18 further comprising, in response to the second state of health being less than a third threshold that is less than the second threshold, generating a second message indicating a fault and to perform fault mitigation.

20. The method of claim 19 further comprising mitigating the fault by reducing the torque command.

* * * * *